US012218432B2

(12) United States Patent
Sugahara et al.

(10) Patent No.: US 12,218,432 B2
(45) Date of Patent: Feb. 4, 2025

(54) ANTENNA MODULE AND COMMUNICATION APPARATUS EQUIPPED WITH THE SAME

(71) Applicant: Murata Manufacturing Co., Ltd., Nagaokakyo (JP)

(72) Inventors: Tadashi Sugahara, Nagaokakyo (JP); Hiroshi Izumitani, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 179 days.

(21) Appl. No.: 18/171,975

(22) Filed: Feb. 21, 2023

(65) Prior Publication Data

US 2023/0198168 A1 Jun. 22, 2023

Related U.S. Application Data

(63) Continuation of application No. PCT/JP2021/022637, filed on Jun. 15, 2021.

(30) Foreign Application Priority Data

Aug. 21, 2020 (JP) ................................ 2020-139735

(51) Int. Cl.
*H01Q 21/24* (2006.01)
*H01Q 1/24* (2006.01)
(Continued)

(52) U.S. Cl.
CPC ............... *H01Q 21/24* (2013.01); *H01Q 1/24* (2013.01); *H01Q 1/48* (2013.01); *H01Q 5/307* (2015.01)

(58) Field of Classification Search
CPC .... H01Q 21/0025; H01Q 21/06; H01Q 21/08; H01Q 21/20; H01Q 21/24; H01Q 21/28;
(Continued)

(56) References Cited

U.S. PATENT DOCUMENTS

2018/0366813 A1 12/2018 Kim et al.
2019/0103653 A1* 4/2019 Jeong .................... H01L 23/645
(Continued)

FOREIGN PATENT DOCUMENTS

JP 2008-113187 A 5/2008
JP 2019-29669 A 2/2019
(Continued)

OTHER PUBLICATIONS

Office Action issued on Apr. 18, 2024, in corresponding Korean patent Application No. 10-2023-7008906, 4 pages.
(Continued)

*Primary Examiner* — Jason M Crawford
(74) *Attorney, Agent, or Firm* — XSENSUS LLP

(57) ABSTRACT

A communications apparatus an antenna module include a first substrate on which a first radiation electrode and a first ground electrode are disposed; a second substrate on which a second radiation electrode and a second ground electrode are disposed; a third substrate on which a third ground electrode is disposed; and a first connection member having a flat plate shape and connected between the first substrate and the second substrate, a fourth ground electrode being disposed on the first connection member. A radio frequency signal is transmitted to the first radiation electrode through the first connection member, and a main surface of the first connection member is in contact with a main surface of the third substrate.

20 Claims, 12 Drawing Sheets

(51) Int. Cl.
*H01Q 1/48* (2006.01)
*H01Q 5/307* (2015.01)

(58) Field of Classification Search
CPC ........ H01Q 1/2283; H01Q 1/24; H01Q 1/242; H01Q 1/243
See application file for complete search history.

(56) References Cited

U.S. PATENT DOCUMENTS

| | | | | |
|---|---|---|---|---|
| 2019/0123441 | A1* | 4/2019 | Sudo | H01Q 1/243 |
| 2019/0229404 | A1* | 7/2019 | Xia | H01Q 21/205 |
| 2019/0229405 | A1* | 7/2019 | Xia | H01Q 21/065 |
| 2019/0372229 | A1* | 12/2019 | Dalmia | H01Q 3/01 |
| 2020/0119453 | A1* | 4/2020 | Takayama | H01Q 1/243 |
| 2020/0161749 | A1* | 5/2020 | Onaka | H01Q 21/24 |
| 2020/0373655 | A1* | 11/2020 | Takayama | H01Q 1/40 |
| 2020/0381843 | A1* | 12/2020 | Murata | H01Q 1/243 |
| 2020/0395681 | A1* | 12/2020 | Ueda | H01L 23/66 |
| 2021/0028546 | A1* | 1/2021 | Yamada | H04B 1/48 |
| 2021/0135364 | A1* | 5/2021 | Yamada | H01Q 9/045 |
| 2021/0143531 | A1* | 5/2021 | Sudo | H01Q 23/00 |
| 2021/0151874 | A1* | 5/2021 | Sudo | H01Q 21/065 |
| 2021/0167506 | A1* | 6/2021 | Sudo | H01Q 1/38 |
| 2021/0320429 | A1* | 10/2021 | Takayama | H01Q 1/243 |
| 2021/0336342 | A1* | 10/2021 | Gouchi | H01Q 5/378 |
| 2022/0115785 | A1* | 4/2022 | Takayama | H01Q 9/045 |
| 2022/0352637 | A1* | 11/2022 | Han | H01Q 1/38 |
| 2022/0368029 | A1* | 11/2022 | Gouchi | H01Q 21/20 |
| 2022/0368031 | A1* | 11/2022 | Gouchi | H01Q 1/2283 |
| 2023/0140655 | A1* | 5/2023 | Onaka | H01Q 1/2283<br>343/702 |
| 2023/0145095 | A1* | 5/2023 | Onaka | H04B 1/0057<br>455/73 |
| 2023/0198168 | A1* | 6/2023 | Sugahara | H01Q 21/28<br>343/702 |
| 2023/0352824 | A1* | 11/2023 | Yamakawa | H01Q 21/08 |
| 2024/0047881 | A1* | 2/2024 | Sugahara | H01Q 5/42 |
| 2024/0186723 | A1* | 6/2024 | Yamada | H01Q 21/08 |

FOREIGN PATENT DOCUMENTS

| | | | |
|---|---|---|---|
| KR | 2003-0038799 | A | 5/2003 |
| KR | 2017-0066944 | A | 6/2017 |
| WO | 2018/230475 | A1 | 12/2018 |
| WO | 2020/017116 | A1 | 1/2020 |
| WO | 2020/138448 | A1 | 7/2020 |
| WO | 2020/149138 | A1 | 7/2020 |

OTHER PUBLICATIONS

International Search Report and Written Opinion mailed on Aug. 31, 2021, received for PCT Application PCT/JP2021/022637, filed on Jun. 15, 2021, 8 pages including English Translation.

* cited by examiner

100E

ANTENNA MODULE AND COMMUNICATION APPARATUS EQUIPPED WITH THE SAME

CROSS-REFERENCE TO RELATED APPLICATIONS

The present application is a continuation of International Application No. PCT/JP2021/022637, filed Jun. 15, 2021, which claims priority to Japanese Patent Application No. 2020-139735, filed in the Japanese Patent Office on Aug. 21, 2020, the entire contents of each of which is incorporated herein by reference in its entirety.

TECHNICAL FIELD

The present disclosure relates to an antenna module and a communication apparatus equipped with the antenna module, and more particularly to a technique for preventing degradation in antenna characteristics of an antenna device included in the communication apparatus.

BACKGROUND ART

WO 2020/017116 (PTL 1) discloses an antenna module included in a communication apparatus in which a radiation electrode and a ground electrode are attached to a housing side of the communication apparatus.

PTL 1 discloses an antenna device to which a radiation electrode and a ground electrode are attached at positions away from a motherboard and relatively close to a housing, to thereby suppress reflection of radio waves from the housing that have been radiated from the radiation electrode.

CITATION LIST

Patent Literature

PTL 1: WO 2020/017116

SUMMARY

Technical Problems

However, when a conductive path from the motherboard to the ground electrode used as an antenna is relatively long, due to the stray capacitance, the potential of the ground electrode used as an antenna becomes higher than the potential of the ground electrode included in the motherboard. In other words, the ground electrode used as an antenna is brought into what is called an electrically floating state.

The ground electrode in this state can function as an unintended new antenna (a resonator) for the ground electrode included in the motherboard. When the communication apparatus includes a plurality of antenna devices having different frequency bands and such an unintended resonator occurs, the resonator is electromagnetically coupled to other antenna devices to generate unnecessary resonance. Thus, generation of such unintended unnecessary resonance may increase the loss in antenna characteristics of other antenna devices having different frequency bands.

The present disclosure has been made in order to solve the above-described, and other, problems. An aspect of the present disclosure is to prevent an increase in loss in antenna characteristics of an antenna device included in a communication apparatus even when the antenna device is disposed at a position away from a motherboard in an antenna module.

Solutions to Problems

Accordingly, one non-limiting antenna module according to the present disclosure includes: a first substrate on which a first radiation electrode and a first ground electrode are disposed; a second substrate on which a second radiation electrode and a second ground electrode are disposed; a third substrate on which a third ground electrode is disposed; and a first connection member having a flat plate shape and connected between the first substrate and the second substrate, a fourth ground electrode being disposed on the first connection member. A radio frequency signal is transmitted to the first radiation electrode through the first connection member, and a main surface of the first connection member is in contact with a main surface of the third substrate.

Advantageous Effects of Disclosure

The antenna module according to the present disclosure includes: a first substrate on which a first radiation electrode and a first ground electrode are disposed; a second substrate on which a second radiation electrode and a second ground electrode are disposed; a third substrate on which a third ground electrode is disposed; and a first connection member having a flat plate shape and connected between the first substrate and the second substrate, a fourth ground electrode being disposed on the first connection member. A radio frequency signal is transmitted to the first radiation electrode through the first connection member. A main surface of the first connection member is in contact with a main surface of the third substrate. In the configuration as described above, especially the potential difference between the fourth ground electrode of the first connection member and the third ground electrode of the third substrate is decreased. Therefore, occurrence of unnecessary resonance can be suppressed, and an increase in loss in antenna characteristics of the antenna device included in the communication apparatus can be prevented.

DESCRIPTION OF EMBODIMENTS

Figure 1:
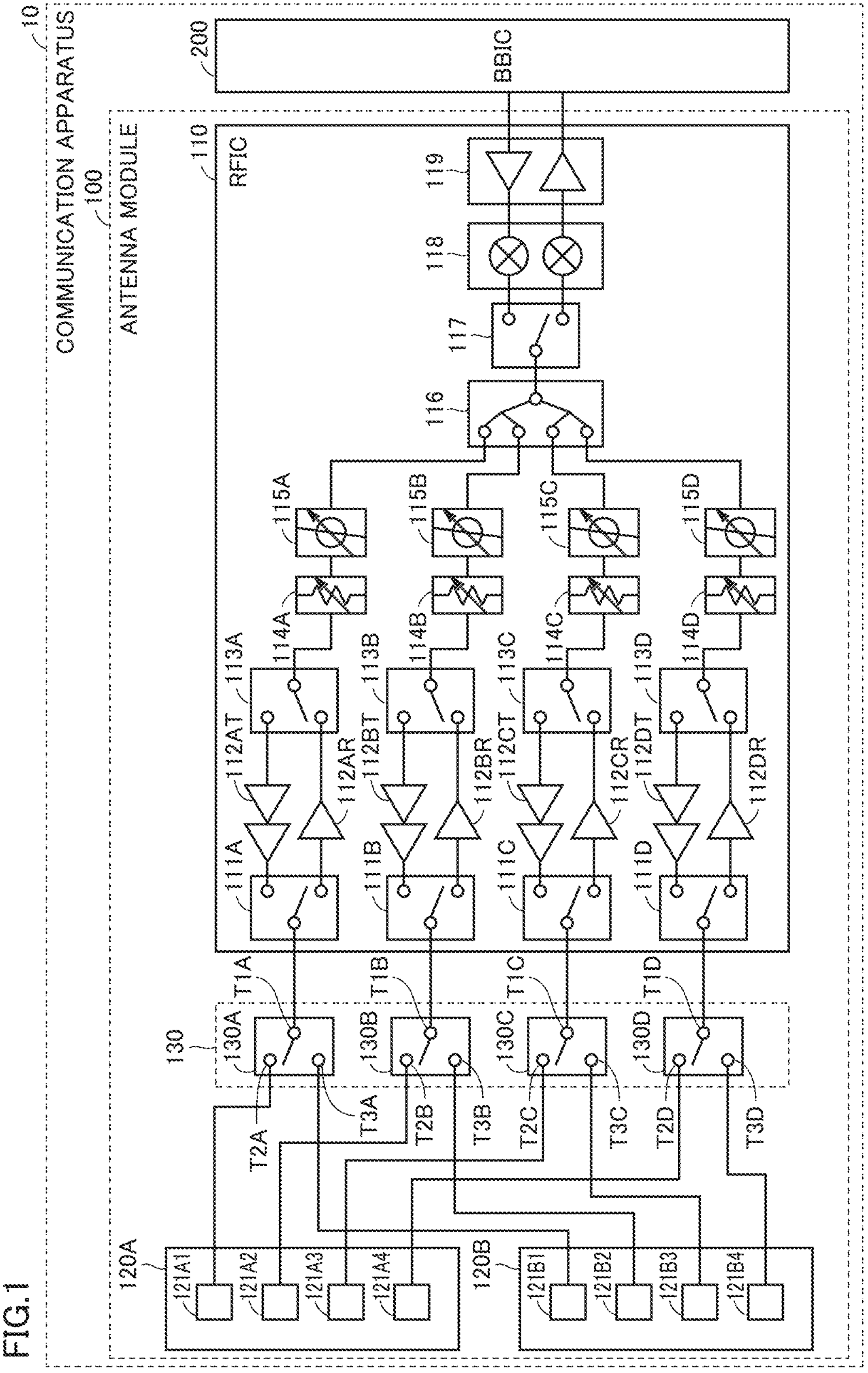
FIG. 1 is an example of a block diagram of a communication apparatus to which an antenna module according to a first embodiment is applied.

Hereinafter, embodiments of the present disclosure will be described in detail with reference to the accompanying drawings. In the accompanying drawings, the same or corresponding portions are denoted by the same reference characters, and the description thereof will not be repeated.

First Embodiment (Basic Configuration of Communication Apparatus)

FIG. 1 is an example of a block diagram of a communication apparatus 10 to which an antenna module 100 according to the present first embodiment is applied. Communication apparatus 10 is, for example, a mobile terminal such as a mobile phone, a smartphone, a tablet computer, a personal computer having a communication function, or a base station.

An example of a frequency band of a radio wave used in antenna module 100 according to the present embodiment is a radio wave in a millimeter wave band having a center frequency of 28 GHz, 39 GHz, 60 GHz, and the like, but a radio wave of a frequency band other than the above is also applicable.

Referring to FIG. 1, communication apparatus 10 is equipped with antenna module 100. Communication apparatus 10 includes a baseband integrated circuit (BBIC) 200 constituting a baseband signal processing circuit. Antenna module 100 includes a radio-frequency (RF) integrated circuit (RFIC) 110, antenna devices 120A and 120B, and a switching circuit 130. Communication apparatus 10 up-converts signals transmitted from BBIC 200 to antenna module 100 into radio frequency signals and radiates the up-converted radio frequency signals from antenna devices 120A and 120B, and also, down-converts the radio frequency signals received by antenna devices 120A and 120B to process the down-converted signals in BBIC 200.

For ease of explanation, in the example shown in FIG. 1, each of antenna devices 120A and 120B (hereinafter collectively referred to as an "antenna device 120") includes four radiation electrodes (power feeding elements). Specifically, antenna device 120A includes radiation electrodes 121A1, 121A2, 121A3, and 121A4, and antenna device 120B includes radiation electrodes 121B1, 121B2, 121B3, and 121B4.

Note that radiation electrodes 121A1 to 121A4 will be also collectively referred to as a "radiation electrode 121A". Further, radiation electrodes 121B1 to 121B4 will be also collectively referred to as a "radiation electrode 121B". Further, radiation electrodes 121A and 121B will be also collectively referred to as a "radiation electrode 121".

In FIG. 1, antenna device 120 is a one-dimensional antenna array in which four radiation electrodes 121 are arranged in a line. Note that antenna device 120 does not necessarily have to be formed of a plurality of radiation electrodes 121 but may be formed of one radiation electrode 121. Further, an array antenna in which a plurality of radiation electrodes 121 are two-dimensionally arranged may also be employed. In the first embodiment, each radiation electrode 121 is a patch antenna having a substantially square flat plate shape. In FIG. 1, for simplifying the description, each of the sides of radiation electrode 121 is disposed parallel to a corresponding one of the sides of the rectangular dielectric substrate, but may not be disposed parallel to a corresponding one of the sides of the rectangular dielectric substrate.

Further, each of radiation electrodes 121 is provided with two power feeding points in order to radiate radio waves in different polarization directions. In another aspect, each radiation electrode 121 may not be a patch antenna but may be another type of antenna such as a slot antenna, a dipole antenna, or a monopole antenna.

RFIC 110 includes switches 111A, 111B, 111C, and 111D, 113A, 113B, 113C, and 113D, and 117, power amplifiers 112AT, 112BT, 112CT, and 112DT, low-noise amplifiers 112AR, 112BR, 112CR, and 112DR, attenuators 114A, 114B, 114C, and 114D, phase shifters 115A, 115B, 115C, and 115D, a signal combiner/splitter 116, a mixer 118, and an amplifier circuit 119.

When a radio frequency signal is transmitted, switches 111A to 111D and 113A to 113D are switched to the side of power amplifiers 112AT to 112DT, and switch 117 is connected to an amplifier on the transmitting side of amplifier circuit 119. When a radio frequency signal is received, switches 111A to 111D and 113A to 113D are switched to the side of low-noise amplifiers 112AR to 112DR, and switch 117 is connected to an amplifier on the receiving side of amplifier circuit 119.

Switching circuit 130 includes switches 130A, 130B, 130C, and 130D, each of which is a single-pole multiple throw switch. Switches 130A to 130D are respectively connected to switches 111A to 111D in RFIC 110. Switching circuit 130 is controlled, for example, by RFIC 110 and configured to switch the connection between RFIC 110 and radiation electrode 121A of antenna device 120A and the connection between RFIC 110 and radiation electrode 121B of antenna device 120B.

Switch 130A includes a first terminal T1A, a second terminal T2A, and a third terminal T3A. First terminal T1A is connected to a common terminal of switch 111A. Second terminal T2A is connected to radiation electrode 121A1 of antenna device 120A. Third terminal T3A is connected to radiation electrode 121B1 of antenna device 120B.

Similarly, switch 130B includes: a first terminal T1B connected to a common terminal of switch 111B; a second terminal T2B connected to radiation electrode 121A2 of antenna device 120A; and a third terminal T3B connected to radiation electrode 121B2 of antenna device 120B. Switch 130C includes: a first terminal T1C connected to a common terminal of switch 111C; a second terminal T2C connected to radiation electrode 121A3 of antenna device 120A; and a third terminal T3C connected to radiation electrode 121B3 of antenna device 120B. Switch 130D includes: a first terminal T1D connected to a common terminal of switch 111D; a second terminal T2D connected to radiation electrode 121A4 of antenna device 120A; and a third terminal T3D connected to radiation electrode 121B4 of antenna device 120B.

When antenna device 120A transmits and receives a radio frequency signal, switches 130A to 130D are respectively switched to second terminals T2A to T2D. When antenna device 120B transmits and receives a radio frequency signal, switches 130A to 130D are respectively switched to third terminals T3A to T3D.

The signal transmitted from BBIC 200 is amplified by amplifier circuit 119 and up-converted by mixer 118. The transmission signal that is the up-converted radio frequency signal is split into four parts by signal combiner/splitter 116, which then respectively pass through four signal paths to be supplied to different radiation electrodes 121. At this time, the phase shift degrees of phase shifters 115A to 115D disposed on the respective signal paths are individually adjusted, and thereby, the directivity of antenna device 120 can be adjusted. Further, attenuators 114A to 114D each adjust the strength of the transmission signal.

The reception signals, each of which is the radio frequency signal received by each antenna element 121, respectively pass through four different signal paths and are combined by signal combiner/splitter 116. The combined reception signal is down-converted by mixer 118, amplified by amplifier circuit 119, and then transmitted to BBIC 200. Note that "radiation electrode 121B" and "radiation electrode 121A" correspond to the "first radiation electrode" and the "second radiation electrode", respectively, in the present disclosure.

(Configuration of Antenna Module)

Figure 2:
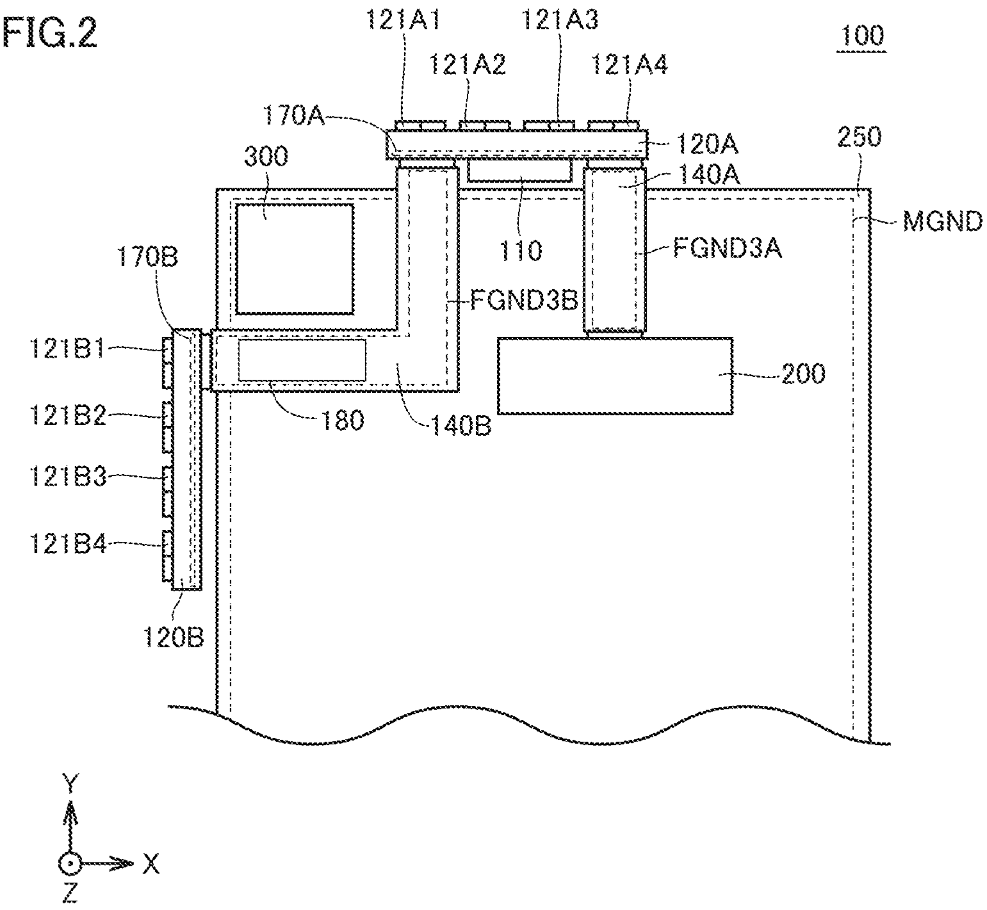
FIG. 2 is a plan view of a motherboard included in the communication apparatus on which the antenna module according to the first embodiment is mounted.

FIG. 2 is a plan view of a motherboard 250 included in communication apparatus 10 on which antenna module 100 according to the first embodiment is mounted. Communication apparatus 10 shown in FIG. 2 is typically a smartphone.

Motherboard 250 is a flat plate-shaped printed circuit board on which components for implementing the functions of communication apparatus 10 are mounted. Motherboard 250 is formed of a multilayer board (MLB), for example. In FIG. 2 and the following description, the direction normal to motherboard 250 is defined as a Z-axis direction, and the directions orthogonal thereto (the in-plane directions of motherboard 250) are defined as an X-axis direction and a Y-axis direction. BBIC 200 and a camera module 300 are mounted on motherboard 250.

As shown in FIG. 2, motherboard 250 that is a planar printed circuit board has camera module 300 and BBIC 200 mounted on its surface on the side in the positive direction of the Z-axis. Other components can also be mounted on the surface of motherboard 250 on the side in the negative direction of the Z-axis. "Motherboard 250" corresponds to the "third substrate", and the "surfaces of motherboard 250 on the sides in the positive direction and the negative direction of the Z-axis" correspond to the "main surfaces of the third substrate" in the present disclosure. Further, the "surfaces of motherboard 250 on the sides in the positive direction and the negative direction of the X-axis" and the "surfaces of motherboard 250 on the sides in the positive direction and the negative direction of the Y-axis" correspond to the "side surfaces of the third substrate" in the present disclosure. In the following description, the surface of motherboard 250 on the side in each of the positive and negative directions of the Z-axis, which is a surface on which camera module 300 and BBIC 200 are mounted, will be referred to as a mounting surface of motherboard 250.

A ground electrode MGND is disposed on the mounting surface of motherboard 250. In FIG. 2, ground electrode MGND is disposed to be widely affixed to the entire mounting surface of motherboard 250 but may be disposed only on a part of the mounting surface of motherboard 250. Further, ground electrode MGND may not be disposed on the surface layer of the mounting surface of motherboard 250 but may be disposed inside motherboard 250.

Camera module 300 is a module for implementing a camera function provided in communication apparatus 10 that is a smartphone, and includes a lens unit, an image sensor, a signal processing unit, and the like.

Antenna module 100 includes: RFIC 110; antenna device 120A in which radiation electrodes 121A1 to 121A4 are provided; and antenna device 120B in which radiation electrodes 121B1 to 121B4 are provided.

Antenna device 120A is connected to BBIC 200 via a connection member 140A. Antenna device 120B is connected to antenna device 120A by a connection member 140B.

RFIC 110 is disposed on the side close to antenna device 120A in the negative direction of the Y-axis. RFIC 110 is electrically connected to BBIC 200 disposed on motherboard 250. Note that "RFIC 110" corresponds to the "power supply circuit" in the present disclosure.

The dielectric substrate forming antenna device 120 is, for example; a low temperature co-fired ceramics (LTCC) multilayer substrate; a multilayer resin substrate formed by stacking a plurality of resin layers made of resin such as epoxy or polyimide; a multilayer resin substrate formed by stacking a plurality of resin layers made of liquid crystal polymer (LCP) having a lower dielectric constant; a multilayer resin substrate formed by stacking a plurality of resin layers made of fluorine resin or a polyethylene terephthalate (PET) material; or a ceramic multilayer substrate made of a material other than LTCC. Note that the dielectric substrate forming antenna device 120 may not necessarily have a multilayer structure but may be a single-layer substrate.

Radiation electrode 121 is formed of a conductor having a flat plate shape and made of a material such as copper or aluminum. The shape of radiation electrode 121 is not limited to a rectangular shape as shown in FIG. 1 but may be a polygonal shape, a circular shape, an elliptical shape, or a cross shape. Radiation electrode 121 is formed on a surface of or in an inner layer of the dielectric substrate.

FIG. 2 shows an example of an array antenna in which four radiation electrodes 121 are arranged in one direction, but the array antenna may be formed of a single radiation electrode 121 or may have a configuration in which a plurality of radiation electrodes are arranged in a one-dimensional arrangement or a two-dimensional arrangement (e.g., one direction being the X direction in FIG. 2 and the other direction being in the Y direction in FIG. 2).

A ground electrode 170A is disposed inside the dielectric substrate of antenna device 120A so as to face radiation electrode 121A. A ground electrode 170B is disposed inside the dielectric substrate of antenna device 120B so as to face radiation electrode 121B.

Note that the "dielectric substrate forming antenna device 120B" and the "dielectric substrate forming antenna device 120A" correspond to the "first substrate" and the "second substrate", respectively, in the present disclosure. "Ground electrode 170B" and "ground electrode 170A" correspond to the "first ground electrode" and the "second ground electrode", respectively, in the present disclosure.

A radio frequency signal from RFIC 110 is supplied to radiation electrode 121A of antenna device 120A. Also, a radio frequency signal from RFIC 110 is supplied to radiation electrode 121B of antenna device 120B via connection member 140B. When a radio frequency signal is supplied to antenna device 120A, radio waves are radiated from radiation electrode 121A but not radiated from radiation electrode 121B. On the other hand, when a radio frequency signal is supplied to antenna device 120B, radio waves are radiated from radiation electrode 121B but not radiated from radiation electrode 121A.

As shown in FIG. 2, radiation electrode 121A is exposed in the positive direction of the Y-axis. Specifically, the radiation direction of the radio waves of antenna device 120A is the positive direction of the Y-axis. In other words, the main surface of antenna device 120A faces the surface of motherboard 250 on the side in the positive direction of the Y-axis, which is a side surface of motherboard 250. On the other hand, radiation electrode 121B is exposed in the negative direction of the X-axis. Specifically, the radiation direction of the radio waves of antenna device 120B is the negative direction of the X-axis. In other words, the main surface of antenna device 120B faces the surface of motherboard 250 on the side in the negative direction of the X-axis, which is a side surface of motherboard 250. Note that the "surface of motherboard 250 on the side in the positive direction of the Y-axis, which is a side surface of motherboard 250" corresponds to the "first surface" in the present disclosure, and the "surface of motherboard 250 on the side in the negative direction of the X-axis, which is a side surface of motherboard 250" corresponds to the "second surface" in the present disclosure.

In this way, antenna devices 120A and 120B included in antenna module 100 according to the first embodiment radiate radio waves in different directions. The "radiation direction of the radio waves of antenna device 120B" and the "radiation direction of the radio waves of antenna device 120A" correspond to the "first radiation direction" and the "second radiation direction", respectively, in the present disclosure.

Connection member 140A has a flat plate shape and serves to connect BBIC 200 and antenna device 120A. Connection member 140A transmits a signal from BBIC 200 to RFIC 110. Connection member 140B has a flat plate shape and serves to transmit a radio frequency signal from RFIC 110 disposed in antenna device 120A to antenna device 120B. For simplifying the description, connection members 140A and 140B may be collectively referred to as a "connection member 140".

Connection member 140 is a flat cable having a flat plate shape. Specifically, the area of an XY plane of connection member 140 is relatively larger than the area of an XZ plane and the area of an YZ plane of connection member 140. For example, in connection member 140A, the length in the Z-axis direction is relatively shorter than the length in the X-axis direction.

Thus, connection member 140 has a surface on the side in the positive direction of the Z-axis (hereinafter referred to as a front surface) and a surface on the side in the negative direction of the Z-axis (hereinafter referred to as a back surface). In the following description, the front and back surfaces of connection member 140 may be collectively referred to as a "main surface". Connection member 140 is disposed such that the back surface of connection member 140 is in contact with the mounting surface of motherboard 250. Connection member 140 is pressed, for example, by a support member or the like from the front surface side (the side in the positive direction of the Z-axis) of connection member 140 toward the side in the negative direction of the Z-axis.

At least one ground electrode is formed inside connection member 140. Connection member 140A includes a ground electrode FGND3A inside connection member 140A so as to face the back surface of connection member 140A. Connection member 140B includes a ground electrode FGND3B inside connection member 140B so as to face the back surface of connection member 140B. Similarly to connection member 140B, ground electrodes FGND3A and FGND3B each have a flat plate shape in which the XY plane is relatively larger than the area of the XZ plane and the area of the YZ plane. In the following description, "ground electrode FGND3A" and "ground electrode FGND3B" may be collectively referred to as a "ground electrode FGND". Note that "connection member 140B" and "connection member 140A" correspond to the "first connection member" and the "second connection member", respectively, in the present disclosure.

As described above, the back surface of connection member 140 is widely in surface contact with the mounting surface of motherboard 250. The back surface of connection member 140 is not necessarily in complete surface contact with the mounting surface of motherboard 250, but a larger surface contact area is more desirable. Note that the front and back surfaces of connection member 140B, which are the "surfaces of connection member 140B on the sides in the positive and negative directions of the Z-axis" in the first embodiment, correspond to the "main surfaces of the first connection member" in the present disclosure.

Inside connection members 140A and 140B, a plurality of power feeding lines are provided. Connection members 140A and 140B each include a dielectric substrate made of ceramics such as LTCC or resin. Connection members 140A and 140B each may be formed of a flexible material or a rigid material that does not deform. Conductive members such as power feeding lines and ground electrodes included in connection members 140A and 140B are connected to each antenna device and motherboard 250 by a detachable connector or with solder.

Figure 3:
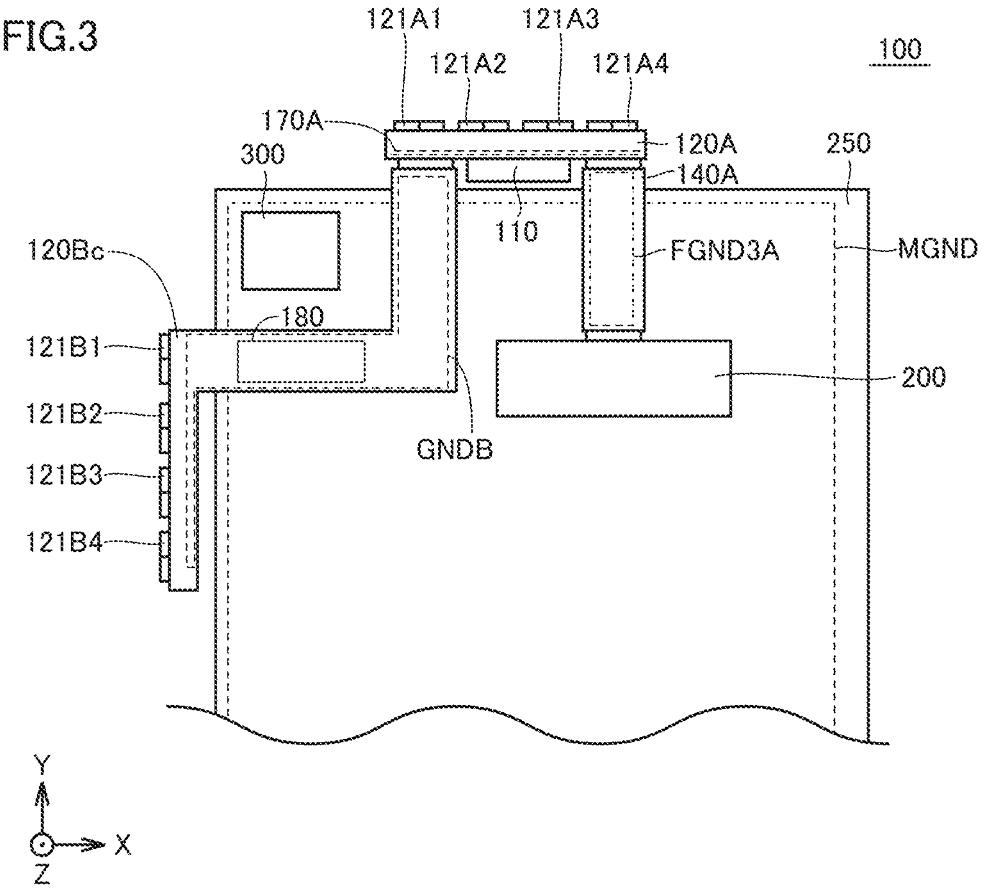
FIG. 3 is a diagram showing a connection member connected to an antenna device with solder.

FIG. 3 is a diagram showing an example in which connection member 140B is connected to antenna device 120B with solder. In FIG. 3, an antenna device 120Bc has a configuration in which antenna device 120B and connection member 140B are integrally formed. A ground electrode GNDB has a configuration in which ground electrodes FGND3B and 170B are integrally formed. This eliminates the need to provide antenna device 120Bc with a connection connector between connection member 140B and antenna device 120B, and thereby, failures of the connection connector can be prevented.

Referring back to FIG. 2, connection member 140B extends such that, in a range from antenna device 120A to antenna device 120B, connection member 140B extending in the negative direction of the Y-axis is bent to extend in the negative direction of the X-axis. Note that the "negative direction of the Y-axis in which connection member 140B extends" and the "negative direction of the X-axis in which connection member 140B extends" correspond to the "first extending direction" and the "second extending direction", respectively, in the present disclosure. The number of times of bending of connection member 140B and the extending directions of connection member 140B are not limited to the number of times of bending and the extending directions shown in FIG. 2. Further, the extending directions may be a direction obliquely intersecting with the X-axis or the Y-axis.

As shown in FIG. 2, antenna device 120B is supplied with electric power from motherboard 250 through BBIC 200, connection member 140A, antenna device 120A, and connection member 140B. In other words, antenna device 120B is disposed at a position to which a signal transmission path from motherboard 250 extends for a long distance.

The frequency of the radio wave used in antenna device 120B is desirably lower than the frequency of the radio wave used in antenna device 120A. For example, it is assumed that the frequency of the radio wave used in antenna device 120B is 28 GHz, and the frequency of the radio wave used in antenna device 120A is 39 GHz. This is because any loss occurring in a transmission line is smaller in the case of the radio frequency signal having a lower frequency than in the case of the radio frequency signal having a higher frequency.

In the first embodiment, an amplifier circuit is further provided in order to prevent a loss in radio frequency received by antenna device 120B on the transmission line. In connection member 140B, a front end module (hereinafter also referred to as "FEM") 180 as an amplifier circuit is disposed in the vicinity of a point of connection to antenna device 120B.

Figure 4:
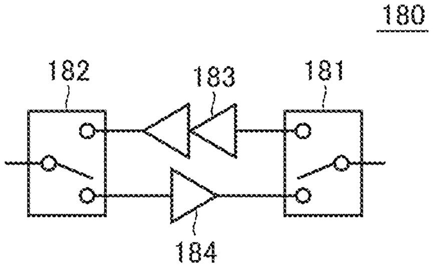
FIG. 4 is a schematic diagram of an FEM.

FIG. 4 is a schematic diagram of FEM 180. As shown in FIG. 4, FEM 180 at least includes switches 181 and 182, a power amplifier 183, and a low-noise amplifier 184, although other components may be included as well. In FEM 180, similarly to switches 111A to 111D and 113A to 113D, power amplifiers 112AT to 112DT, and low-noise amplifiers 112AR to 112DR provided inside RFIC 110, switches 181 and 182 are switched to the side of power amplifier 183 when a radio frequency signal is transmitted, and switches 181 and 182 are switched to the side of low-noise amplifier 184 when a radio frequency signal is received.

Power amplifier 183 and low-noise amplifier 184 each are a single element and can cover a plurality of bands. Alternatively, power amplifier 183 and low-noise amplifier 184 may be provided as separate elements for each band.

Further, FEM 180 includes a controller unit (not shown). The controller unit controls switches 181 and 182, power amplifier 183, and low-noise amplifier 184. The controller unit may be a programmable circuitry (e.g., microcontroller or computer), or dedicated circuitry (e.g., application specific integrated circuit).

FEM 180, which is an amplifier circuit, amplifies a radio frequency signal transmitted between RFIC 110 and antenna device 120B to compensate for attenuation occurring between RFIC 110 and antenna device 120B.

In this way, FEM 180 can amplify the radio frequency signal to reduce the loss occurring in the transmission line, and therefore, antenna device 120B can use a radio wave of 39 GHz that is a relatively high frequency band. Although the term "high frequency" is used here, it is to be construed generally as radio frequency, and not merely the HF communication band (3 MHz to 30 MHz).

In particular, it is desirable that FEM 180 is disposed in the vicinity of antenna device 120B to which a signal transmission path from RFIC 110 extends for a relatively long distance. Thereby, FEM 180 can prevent the amplification factor from becoming insufficient in the power amplifier and the low-noise amplifier in RFIC 110. Note that "FEM 180" corresponds to the "amplifier circuit" in the present disclosure. While the term "circuit" is used, it may also be described as circuitry, which has one or more circuits.

FIG. 4 has been described with regard to the case where FEM 180 includes both power amplifier 183 and low-noise amplifier 184, but FEM 180 may include at least one of power amplifier 183 and low-noise amplifier 184, or may include only one of power amplifier 183 and low-noise amplifier 184. Further, connection member 140B may be configured not to include FEM 180.

Figure 5:
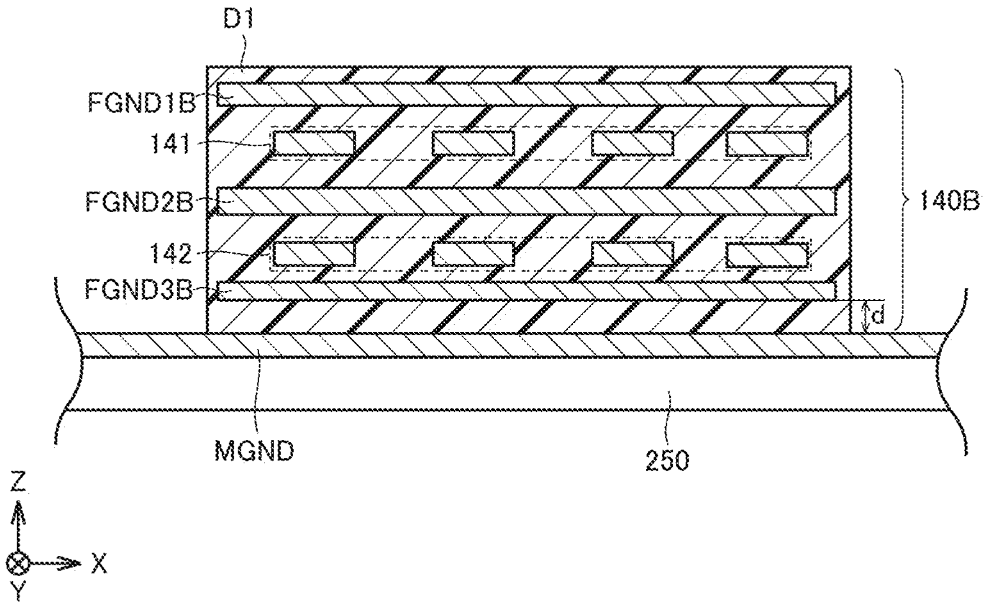
FIG. 5 is a cross-sectional view of the connection member disposed on the motherboard.

FIG. 5 is a cross-sectional view of connection member 140B disposed on motherboard 250. Connection member 140B includes a dielectric D1, a transmission electrode 141, a transmission electrode 142, a ground electrode FGND1B, a ground electrode FGND2B, and a ground electrode FGND3B. Dielectric D1 is a base material of connection member 140B and, for example, made of resin such as polyimide.

Each of transmission electrodes 141 and 142 includes four transmission electrodes. Transmission electrode 141 is sandwiched between ground electrodes FGND1B and FGND2B and thereby functions as a triplate line. Transmission electrode 142 is sandwiched between ground electrodes FGND2B and FGND3B and thereby functions as a triplate line.

Connection member 140B having transmission electrodes 141 and 142 includes a total of eight transmission electrodes. Each radiation electrode 121 included in antenna device 120 is configured to radiate radio waves in two different polarization directions, and thus, two power feeding points are provided in each radiation electrode 121. Specifically, one antenna device 120 includes eight power feeding points, and a radio frequency signal is supplied by each of eight transmission electrodes of the connection member.

Connection member 140B is pressed by a support member or the like from the side in the positive direction of the Z-axis, and thus, the back surface of connection member 140B is widely in surface contact with the mounting surface of motherboard 250. Thereby, a distance d between ground electrode MGND of motherboard 250 and ground electrode FGND3 of connection member 140B becomes smaller as compared with the case where the back surface of connection member 140B is not in contact with the mounting surface of motherboard 250. Distance d shows a distance between ground electrodes MGND and FGND3. Note that "ground electrode MGND" and "ground electrode FGND3" correspond to the "third ground electrode" and the "fourth ground electrode", respectively, in the present disclosure.

Referring back to FIG. 2, connection member 140B is connected to antenna device 120B to which a signal transmission path from motherboard 250 extends for a long distance. Due to the stray capacitance, ground electrode 170B included in antenna device 120B or ground electrode FGND3B included in connection member 140B is higher in potential than ground electrode MGND included in motherboard 250. Due to higher potential, ground electrodes 170B and FGND3B each are in what is called an electrically floating state.

Due to the potential difference from ground electrode MGND included in motherboard 250, connection member 140B and ground electrode FGND3B each can function as an antenna (a resonator). In antenna module 100 of the first embodiment, the back surface of connection member 140 is in contact with the mounting surface of motherboard 250 as shown in FIG. 5, and thereby, distance d between ground electrodes FGND3B and MGND decreases. At this time, distance d is 0.1 mm to 0.2 mm in length, for example.

As distance d between ground electrodes FGND3B and MGND decreases, the capacitance occurring between ground electrodes FGND3B and MGND increases. Further, the capacitive reactance is inversely proportional to the capacitance, and thus, the capacitive reactance decreases as the capacitance increases.

In other words, as distance d between ground electrodes FGND3B and MGND decreases, the capacitive reactance between ground electrodes FGND3B and MGND decreases. As a result, ground electrodes FGND3B and MGND are connected to each other at a high frequency, and the potential difference between ground electrodes FGND3B and MGND is decreased. In other words, the potential of ground electrode FGND3B that is higher than the potential of ground electrode MGND due to the stray capacitance is decreased.

Therefore, the potential difference between ground electrodes FGND3B and 170B is decreased, so that occurrence of an unintended resonator is prevented. In this way, in antenna module 100 according to the first embodiment, distance d between ground electrodes FGND3B and MGND is decreased. This decreases the potential difference between ground electrodes FGND3 and MGND, to prevent unintended coupling between ground electrodes FGND3 and MGND, and thereby, occurrence of unnecessary resonance between these ground electrodes and other antenna devices can be prevented.

Since RFIC 110 includes power supply circuitry including power amplifiers 112AT to 112DT and/or low-noise amplifiers 112AR to 112DR, heat may be generated during signal amplification. Antenna device 120A is located to protrude from motherboard 250. Thus, antenna device 120A and the housing of communication apparatus 10 are located close to each other, so that the heat from RFIC 110 may partially raise the temperature of the housing.

In antenna module 100 according to the first embodiment, connection member 140B is disposed to be in surface contact with motherboard 250. Thereby, the heat generated in RFIC 110 can be transferred to motherboard 250 through connection member 140B connected to antenna device 120A, so that the heat dissipation efficiency can be improved in antenna module 100.

Further, connection member 140B receives heat transferred not only from RFIC 110 but also from FEM 180. Similarly to RFIC 110, FEM 180 is an amplifier circuit including power amplifier 183 and/or low-noise amplifier 184, and thus, heat may be generated during signal amplification. In antenna module 100, the heat generated in FEM 180 can also be transferred to motherboard 250 via connection member 140B, and thereby, the heat dissipation efficiency is improved. Connection member 140B and motherboard 250 may be in contact with each other while a member having high heat transfer efficiency (for example, metal such as copper) is interposed therebetween.

Further, in the configuration formed like antenna module 100 in FIG. 2, connection member 140B can be disposed while bypassing camera module 300. In other words, in antenna module 100, occurrence of unnecessary interference between connection member 140B and other components can be prevented.

Positioning antenna devices 120A and 120B at corners portions of motherboard 250 can shorten the line length of connection member 140B. Note that antenna device 120B may be formed integrally with the housing (not shown) of communication apparatus 10. Specifically, radiation electrode 121B is disposed in the housing of communication apparatus 10, and connection member 140B connects the housing and antenna device 120A. In other words, antenna module 100 may include: the housing of communication apparatus 10 in which radiation electrode 121B is disposed; antenna device 120A in which radiation electrode 121A and ground electrode 170A are disposed; motherboard 250 in which ground electrode MGND is disposed; and connection member 140B having a flat plate shape, connected between the housing and antenna device 120A, and having ground electrode FGND3B disposed therein. A radio frequency signal may be transmitted to radiation electrode 121B through connection member 140B, and the main surface of connection member 140B may be in contact with the main surface of motherboard 250.

Comparative Example

Figure 6:
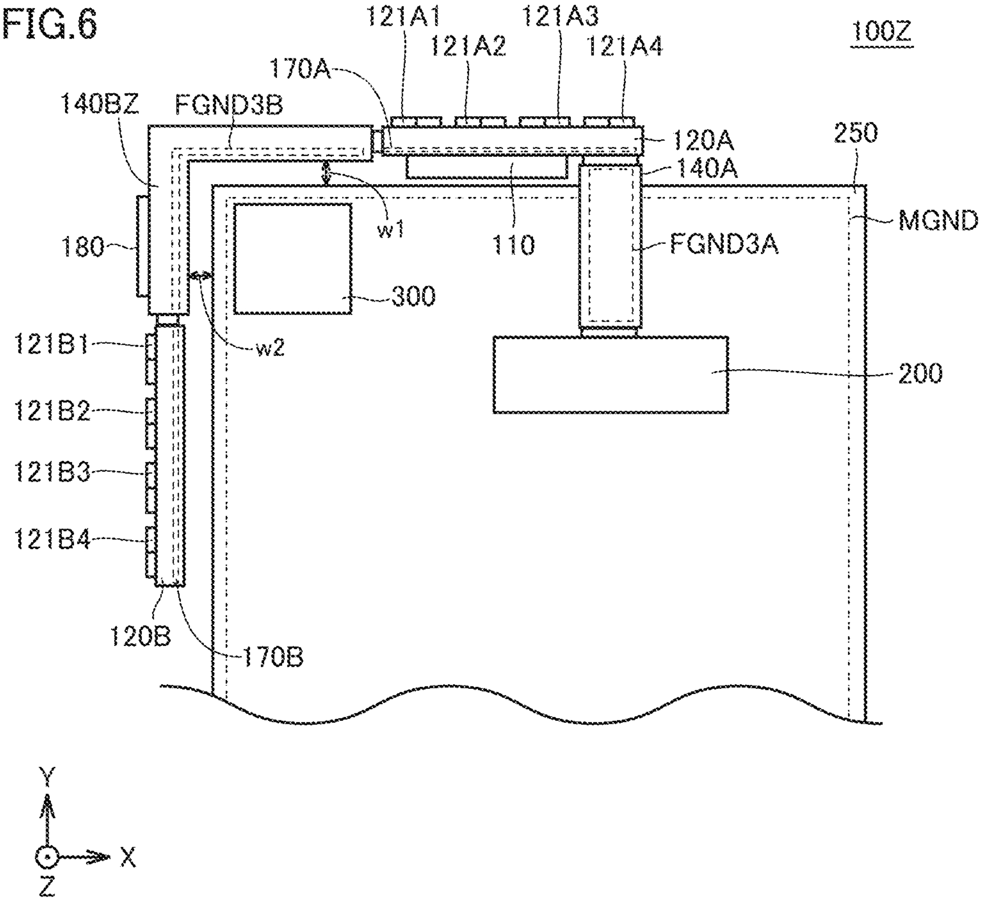
FIG. 6 is a plan view of the motherboard included in the communication apparatus on which an antenna module according to a comparative example with respect to the first embodiment is mounted.

FIG. 6 is a plan view of motherboard 250 included in communication apparatus 10 on which an antenna module 100Z according to a comparative example of the first embodiment is mounted. Antenna module 100Z in FIG. 6 includes connection members 140A and 140BZ and an FEM 180 in addition to BBIC 200 disposed on motherboard 250 and antenna devices 120A and 120B as in the first embodiment. For antenna module 100Z in FIG. 6, the description of the same elements as those in antenna module 100 in FIG. 2 will not be repeated.

In FIG. 6, connection member 140BZ connects antenna device 120A to antenna device 120B via the corner portion of motherboard 250 without extending over the mounting surface of the motherboard. This produces air layers w1 and w2 between connection member 140BZ and motherboard 250. Even when connection member 140BZ is supported by a support member or the like and connected via the corner portion of motherboard 250, air layers corresponding to air layers w1 and w2 may be produced at least partially between connection member 140BZ and motherboard 250.

Specifically, the area of contact between the back surface of connection member 140BZ and the mounting surface of motherboard 250 is smaller than the area of contact between the back surface of connection member 140B and the mounting surface of motherboard 250 shown in FIGS. 2 and 5.

Thus, the potential of ground electrode FGND3B that is higher than the potential of ground electrode MGND due to the stray capacitance is not decreased, and thereby, a potential difference exists between ground electrodes FGND3B and 170B. Therefore, ground electrode FGND3B or 170B and ground electrode MGND of motherboard 250 unintentionally function as a resonator, and thereby may cause unnecessary resonance with other antenna devices. As a result, losses in antenna characteristics of other antenna devices increase.

Further, since the area of contact between the back surface of connection member 140B and the mounting surface of motherboard 250 is small, the heat generated by RFIC 110 and FEM 180 and transferred to connection member 140B cannot be efficiently dissipated to motherboard 250, with the result that the heat is transferred to the housing.

First Modification

In the description about the configuration in FIG. 2, antenna devices 120A and 120B radiate radio waves in the X-axis direction or the Y-axis direction along the mounting surface of motherboard 250. However, depending on communication apparatus 10, the radio wave from antenna device 120 may be radiated in the Z-axis direction that is orthogonal to the mounting surface of motherboard 250.

Figure 7:
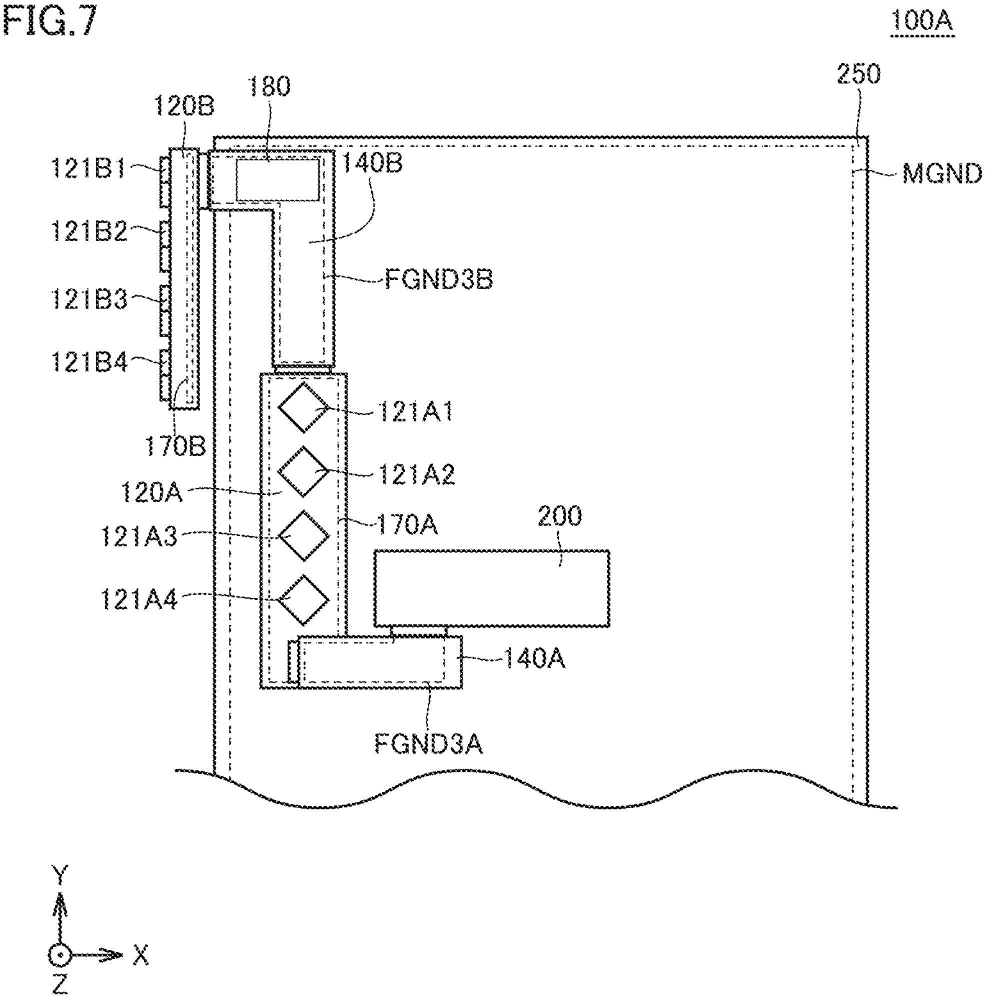
FIG. 7 is a plan view of the motherboard included in the communication apparatus on which an antenna module according to a first modification is mounted.

FIG. 7 is a plan view of motherboard 250 included in communication apparatus 10 on which an antenna module

100A according to the first modification is mounted. Similarly to antenna module 100 in FIG. 2, antenna module 100A in FIG. 7 includes connection members 140A and 140B and an FEM 180 in addition to BBIC 200 mounted on motherboard 250 and antenna devices 120A and 120B. For antenna module 100A in FIG. 7, the detailed description of the same elements as those in antenna module 100 in FIG. 2 will not be repeated.

In FIG. 7, the radiation direction of the radio wave radiated from antenna device 120A is different from the radiation direction of the radio wave from antenna device 120A in FIG. 2. As shown in FIG. 7, radiation electrodes 121A1 to 121A4 of antenna device 120A radiate radio waves in the positive direction of the Z-axis. Connection member 140B in FIG. 7 connects antenna device 120A that radiates radio waves in the Z-axis direction and antenna device 120B that radiates radio waves in the X-axis direction. As described above, even when one of antenna devices 120 radiates radio waves in the direction normal to the main surface of motherboard 250, but when the main surface of connection member 140B is in contact with the main surface of motherboard 250, occurrence of unnecessary resonance can be prevented and the heat dissipation efficiency can be improved.

In the above description about the configuration in FIG. 7, antenna device 120B radiates radio waves in the X-axis direction and antenna device 120A radiates radio waves in the Z-axis direction, but antenna device 120B may radiate radio waves in the Z-axis direction and antenna device 120A may radiate radio waves in the X-axis direction or the Y-axis direction.

Figure 8:
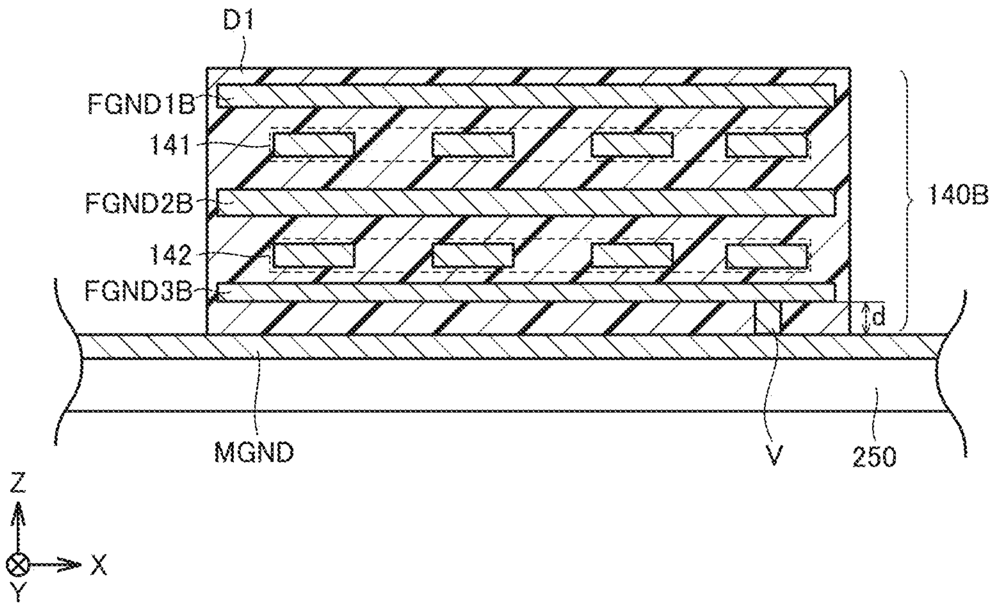
FIG. 8 is a cross-sectional view of a connection member and the motherboard according to the first modification.

FIG. 8 is a cross-sectional view of connection member 140B and motherboard 250 according to the first modification. Note that the detailed description about the same elements in the cross-sectional view of connection member 140B and motherboard 250 in FIG. 5 as those in the cross-sectional view of connection member 140B and motherboard 250 in FIG. 8 will not be repeated.

In the above description about the configuration in FIG. 5, connection member 140B is pressed by a support member or the like, and thereby, the back surface of connection member 140B comes into contact with the mounting surface of motherboard 250. In FIG. 8, a via V is provided between connection member 140B and motherboard 250. Via V allows electrical connection between connection member 140B and motherboard 250.

Thereby, ground electrodes FGND3B and MGND have the same potential and show no potential difference therebetween, so that occurrence of unnecessary resonance can be prevented. Further, in antenna module 100A, connection member 140B and motherboard 250 are fixed by via V. This makes it possible to more stably maintain a large area of contact between the back surface of connection member 140B and the mounting surface of motherboard 250. As a result, the heat generated in RFIC 110 and FEM 180 is more efficiently dissipated through connection member 140B.

Alternatively, among dielectrics D1 forming connection member 140B, connection member 140B may not include a dielectric that is disposed between ground electrodes FGND3B and MGND. In other words, connection member 140B is configured such that ground electrode FGND3B is exposed on the side in the negative direction of the Z-axis. Ground electrode FGND3B that is exposed and ground electrode MGND are bonded to each other with a conductive adhesive or solder. Thereby, ground electrodes FGND3B and MGND are brought into direct surface contact with each other, to thereby more reliably allow ground electrodes FGND3B and MGND to have the same potential and show no potential difference therebetween.

Second Modification

In the above description with reference to FIGS. 2 and 7, antenna devices 120A and 120B radiate radio waves in different directions. However, it is conceivable that increasing the strength of the radio waves by radiation of the radio waves from a plurality of antenna devices in the same direction may be required.

Figure 9:
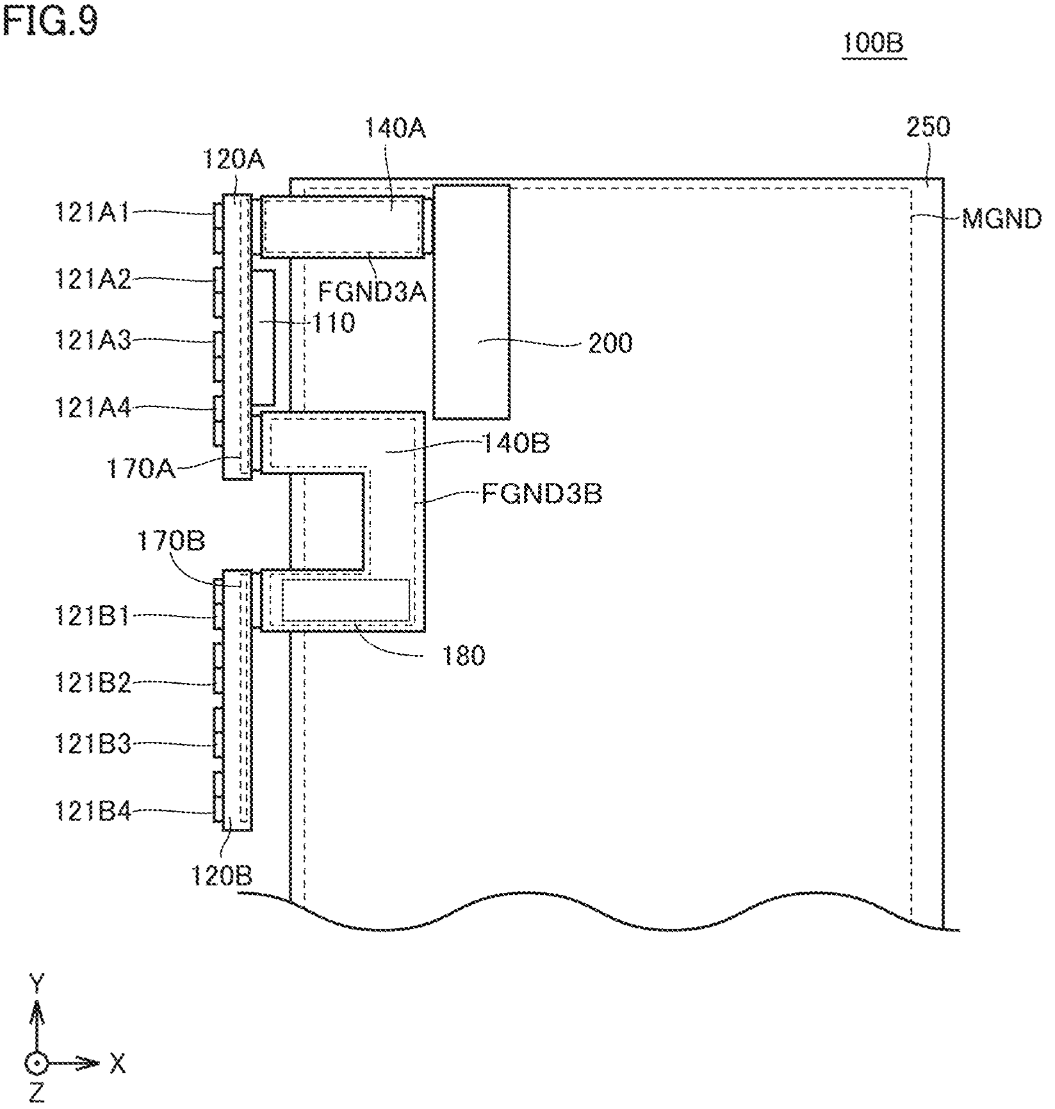
FIG. 9 is a plan view of the motherboard included in the communication apparatus on which an antenna module according to a second modification is mounted.

Thus, the second modification will be described with regard to a configuration in which antenna devices 120A and 120B both radiate radio waves in the negative direction of the X-axis. FIG. 9 is a plan view of motherboard 250 included in communication apparatus 10 on which an antenna module 100B according to the second modification is mounted. Referring to FIG. 9, connection member 140B connects antenna device 120A that radiates radio waves in the negative direction of the X-axis and antenna device 120B that radiates radio waves in the negative direction of the X-axis.

At this time, connection member 140B is connected to antenna devices 120A and 120B along the mounting surface of motherboard 250 without passing through the shortest path between antenna devices 120A and 120B. Even in the case of the connection between antenna devices 120 that radiate radio waves in the same direction, connection member 140B is disposed such that its back surface comes into contact with the mounting surface of motherboard 250, to thereby increase the area of contact between connection member 140B and motherboard 250, so that the potential difference between the ground electrodes can be decreased. Therefore, also in the connection between antenna devices 120 that radiate radio waves in the same direction, occurrence of unnecessary resonance can be prevented and the heat dissipation efficiency can be improved.

Third Modification

In the above description about the configuration in the second modification, at least antenna device 120A or 120B radiates radio waves in the direction toward the mounting surface of motherboard 250. However, it is conceivable that both antenna devices 120A and 120B may radiate radio waves in the direction orthogonal to the mounting surface. For example, antenna device 120A may radiate radio waves in the positive direction of the Z-axis, and antenna device 120B may radiate radio waves in the negative direction of the Z-axis.

Figure 10:
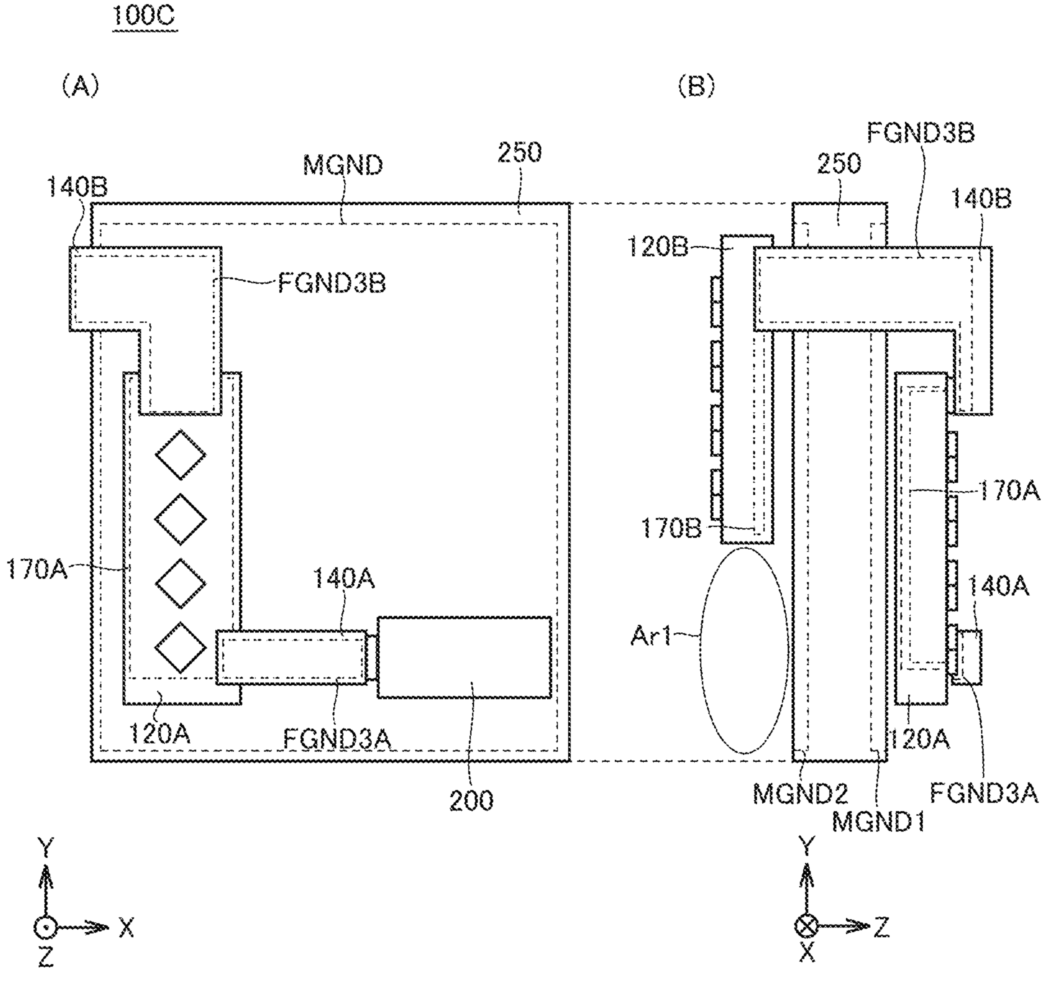
FIG. 10 includes two related sub-figures FIG. 10(*a*), and FIG. 10(*b*), and is a plan view and a side view of the motherboard included in the communication apparatus on which an antenna module according to a third modification is mounted.

The third modification will be described with regard to a configuration in which antenna devices 120A and 120B are disposed so as to face opposite to each other in the Z-axis direction. FIG. 10 is a plan view (FIG. 10(A)) and a side view (FIG. 10(B)) of motherboard 250 included in communication apparatus 10 on which an antenna module 100C according to the third modification is mounted.

BBIC 200 is mounted on the mounting surface of motherboard 250. Connection member 140A connects antenna device 120A to BBIC 200. Connection member 140B is disposed to extend from the mounting surface of motherboard 250 toward the back surface of motherboard 250 in the direction opposite to the mounting surface, and connects antenna device 120A to antenna device 120B. Antenna device 120A radiates radio waves in the positive direction of the Z-axis, and antenna device 120B radiates radio waves in the negative direction of the Z-axis. In other words, the main surface of antenna device 120A faces the surface of motherboard 250 on the side in the positive direction of the Z-axis, which is the main surface of motherboard 250. Also, the main surface of antenna device 120B faces the surface of motherboard 250 on the side in the negative direction of the Z-axis, which is the main surface of motherboard 250. The "surface of motherboard 250 on the side in the positive direction of the Z-axis, which is the main surface of motherboard 250" corresponds to the "third surface" in the present disclosure, and the "surface of motherboard 250 on the side in the negative direction of the Z-axis, which is the main surface of motherboard 250" corresponds to the "fourth surface" in the present disclosure. Motherboard 250 includes ground electrodes MGND1 and MGND2. Ground electrode MGND1 is disposed to be exposed on the side in the positive direction of the Z-axis, and ground electrode MGND2 is disposed to be exposed on the side in the negative direction of the Z-axis. Ground electrodes MGND1 and MGND2 are connected to each other through a path (not shown).

In this way, even when antenna devices 120A and 120B radiate radio waves in the directions opposite to each other, but when connection member 140B is disposed to extend from the mounting surface of motherboard 250 toward the surface opposite to the mounting surface, the back surface of connection member 140B comes into contact with the mounting surface of motherboard 250 on the side in the positive direction of the Z-axis. Thereby, the potential difference between ground electrode FGND3B of connection member 140B and ground electrode MGND1 of motherboard 250 is decreased.

Further, connection member 140B may be configured to contact the mounting surface of motherboard 250 on the side in the negative direction of the Z-axis in addition to the mounting surface of motherboard 250 on the side in the positive direction of the Z-axis. Thereby, the potential difference between ground electrode FGND3B disposed in the vicinity of antenna device 120B and ground electrode MGND of motherboard 250 can be decreased, and thus, occurrence of unnecessary resonance can be more effectively prevented.

In antenna module 100C, antenna device 120B is disposed on the side in the positive direction of the Y-axis on the mounting surface of motherboard 250 on the side in the negative direction of the Z-axis, and thereby, an area Ar1 is produced. Thus, in antenna module 100C, other components such as a camera module can be disposed in area Ar1.

Fourth Modification

In the above description about the configuration in the third modification, antenna device 120B is disposed on the side in the positive direction of the Y-axis on the mounting surface of motherboard 250 on the side in the negative direction of the Z-axis. However, it is conceivable that more reliable reduction of the potential difference between ground electrode FGND3 and ground electrode MGND2 that is included in motherboard 250 and disposed on the side in the negative direction of the Z-axis may be required.

Figure 11:
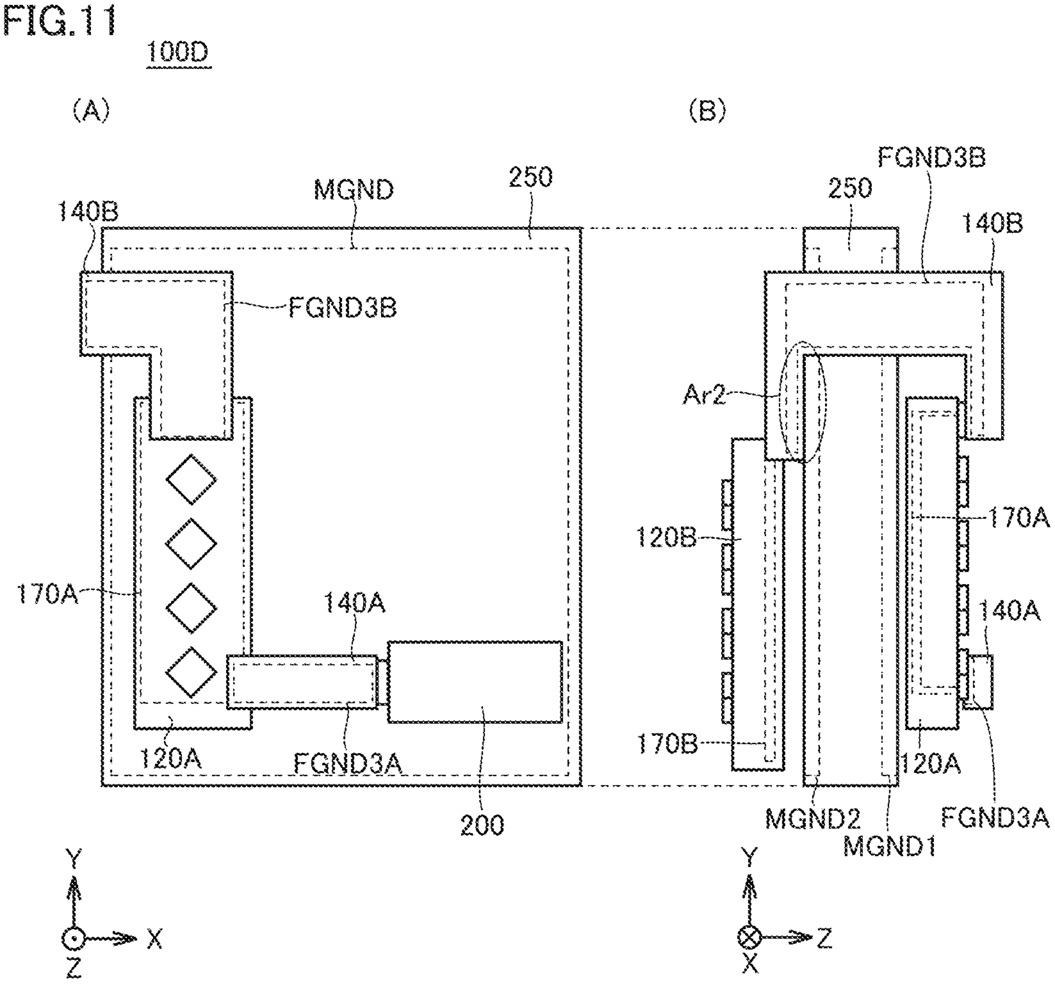
FIG. 11 includes two related sub-figures FIG. 11(*a*), and FIG. 11(*b*), and is a plan view and a side view of the motherboard included in the communication apparatus on which an antenna module according to a fourth modification is mounted.

FIG. 11 is a plan view (FIG. 11(A)) and a side view (FIG. 11(B)) of motherboard 250 included in communication apparatus 10 on which an antenna module 100D according to the fourth modification is mounted.

In antenna module 100D in FIG. 11, connection member 140B further extends on the mounting surface of motherboard 250 on the side in the negative direction of the Z-axis so as to be connected to antenna device 120B. Thereby, connection member 140B is widely in surface contact with motherboard 250 in an area Ar2. Thus, the potential difference between ground electrodes FGND3B and MGND2 can be more reliably decreased.

Fifth Modification

In the above description about the configuration in each of the third and fourth modifications, motherboard 250 is made of a rigid member. However, when a display provided in communication apparatus 10 is formed of a bendable member, a flexible motherboard 250 may be used.

Figure 12:
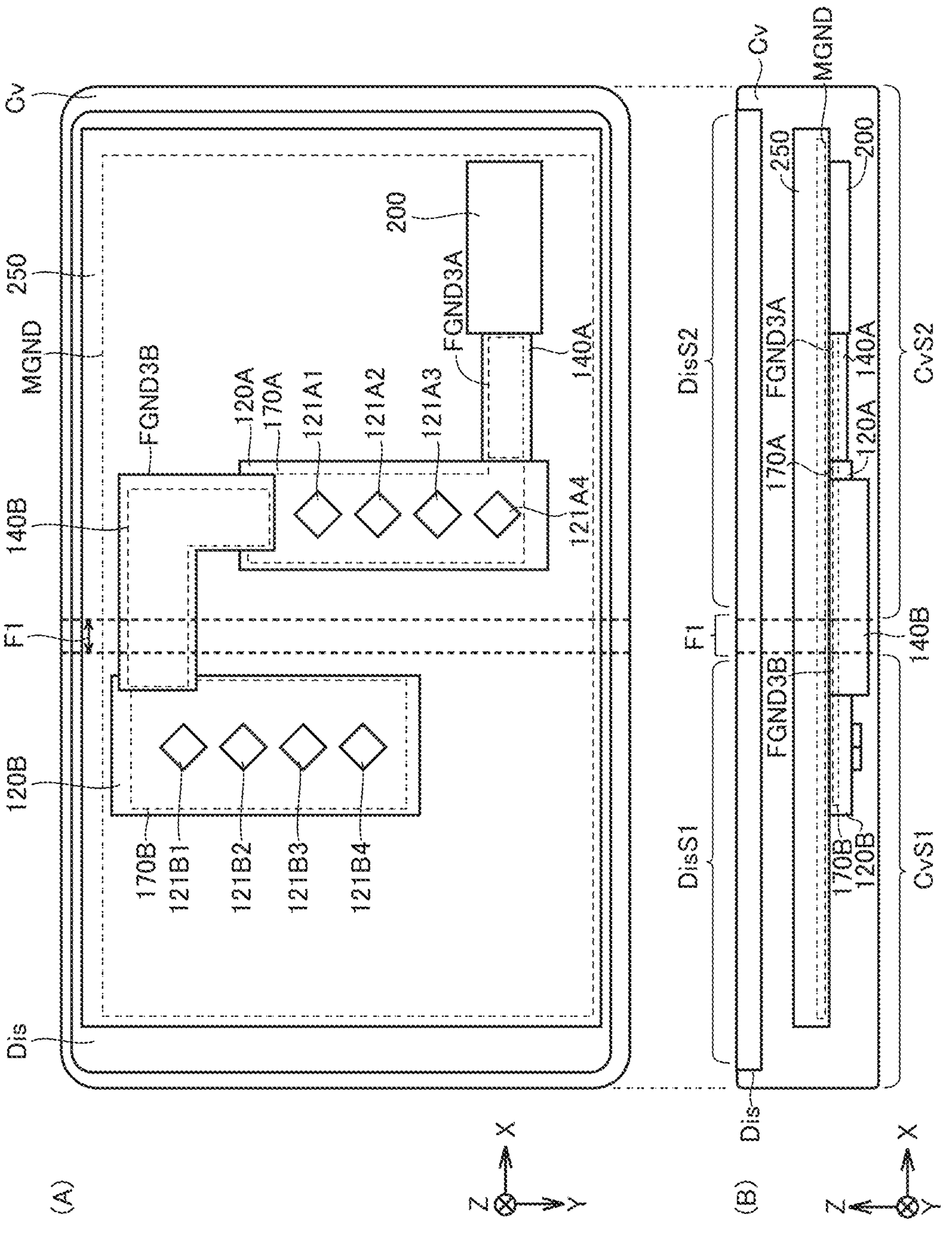
FIG. 12 includes two related sub-figures FIG. 12(*a*), and FIG. 12(*b*), and is a rear view and a side view of the motherboard included in the communication apparatus on which an antenna module according to a fifth modification is mounted.

FIG. 12 is a rear view (FIG. 12(A)) and a side view (FIG. 12(B)) of motherboard 250 included in communication apparatus 10 on which an antenna module 100E according to the fifth modification is mounted. Communication apparatus 10 is a smartphone having a display Dis that is bendable at a bending portion F1 as a fulcrum point to the side in the positive or negative direction of the Z-axis.

A housing Cv is an outermost housing included in communication apparatus 10. As shown in FIG. 12(B), display Dis is disposed to face in the positive direction of the Z-axis. Specifically, a user sees communication apparatus 10 from the side in the positive direction of the Z-axis and thereby can check the information displayed on display Dis.

As shown in FIG. 12(B), motherboard 250 is disposed on the side in the negative direction of the Z-axis of display Dis inside housing Cv. Connection member 140B is disposed to protrude above the mounting surface of motherboard 250 and extend across bending portion F1. Thereby, antenna device 120B can be disposed in a region in which it does not overlap with motherboard 250 when motherboard 250 is seen in a plan view. By disposing connection member 140B in this way, antenna device 120B is disposed to face a display surface DisS1, and antenna device 120A is disposed to face a display surface DisS2.

Communication apparatus 10 is configured such that display Dis is bendable at bending portion F1 as a fulcrum point toward the side in the positive direction of the Z-axis. When display Dis is bent toward the side in the positive direction of the Z-axis, display surfaces DisS1 and DisS2 of display Dis face each other and come into surface contact with each other. Bending at bending portion F1 toward the side in the positive direction of the Z-axis causes antenna devices 120A and 120B to face opposite to each other.

Alternatively, communication apparatus 10 is bendable at bending portion F1 as a fulcrum point toward the side in the negative direction of the Z-axis. When communication apparatus 10 is bent toward the side in the negative direction of the Z-axis, housing surfaces CvS1 and CvS2 of housing Cv face each other and come into surface contact with each other, so that antenna devices 120A and 120B face each other.

As shown in FIG. 12, even when antenna device 120B is disposed at a position away from motherboard 250 across bending portion F1, connection member 140B is disposed to come into surface contact with the mounting surface of motherboard 250, with the result that occurrence of unnecessary resonance can be prevented and the heat dissipation efficiency can be improved.

In addition, "display Dis" corresponds to the "display unit" in the present disclosure. Also, "display surface DisS1" and "display surface DisS2" correspond to the "first display surface" and the "second display surface", respectively, in the present disclosure.

In antenna module 100E, motherboard 250 may be divided into a region overlapping with display surface DisS1 and a region overlapping with display surface DisS2 when seen in a plan view in the Z-axis direction, and a separate motherboard may be provided. In other word, motherboard 250 is divided along bending portion F1 as a boundary. Alternatively, motherboard 250 may be disposed only in one of the region overlapping with display surface DisS1 and the region overlapping with display surface DisS2 when seen in a plan view in the Z-axis direction.

It should be understood that the embodiments disclosed herein are illustrative and non-restrictive in every respect. The scope of the present invention is defined by the terms of the claims, rather than the above description of the embodiments, and is intended to include any modifications within the meaning and scope equivalent to the terms of the claims.

REFERENCE SIGNS LIST

10 communication apparatus, 100, 100A, 100B, 100C, 100D, 100E, 100Z antenna module, 111A, 111B, 111C, 111D, 113A, 113D, 117, 130A, 130B, 130C, 130D, 181 switch, 112AR, 112DR, 184 low noise amplifier, 112AT, 112DT, 183 power amplifier, 114A, 114D attenuator, 115A, 115D phase shifter, 116 splitter, 118 mixer, 119 amplifier circuit, 120, 120A, 120B, 120Bc antenna device, 121, 121A, 121A1, 121A2, 121A3, 121A4, 121B, 121B1, 121B2, 121B3, 121B4 radiation electrode, 130 switching circuit, 140, 140A, 140B, 140BZ connection member, 141, 142 transmission electrode, 170A, 170B, FGND1B, FGND2B, FGND3B, GNDB, FGND3A, MGND, MGND1, MGND2 ground electrode, 250 motherboard, 300 camera module, Ar1, Ar2 area, Cv housing, CvS1, CvS2 housing surface, D1 dielectric, Dis display, DisS1, DisS2 display surface, F1 bending portion, T1D, T1A, T1B, T1C first terminal, T2A, T2D, T2B, T2C second terminal, T3C, T3D, T3B, T3A third terminal, V via, d distance, w1, w2 air layer.

The invention claimed is:

1. An antenna module comprising:

a first substrate on which a first radiation electrode and a first ground electrode are disposed;

a second substrate on which a second radiation electrode and a second ground electrode are disposed;

a third substrate on which a third ground electrode is disposed; and a first connection member having a flat plate shape and connected between the first substrate and the second substrate, a fourth ground electrode being disposed on the first connection member, wherein the first connection member is configured to convey a radio frequency signal therethrough to the first radiation electrode, and a main surface of the first connection member is in contact with a main surface of the third substrate.

2. The antenna module according to claim 1, wherein the first connection member is disposed such that the third ground electrode and the fourth ground electrode overlap with each other as seen in a plan view in a direction normal to the main surface of the first connection member.

3. The antenna module according to claim 2, wherein the first connection member has at least one bent portion at which the first connection member extending in a first extending direction is bent to extend in a second extending direction in a region from the first substrate to the second substrate.

4. The antenna module according to claim 3, wherein the third ground electrode is substantially equal in potential to the fourth ground electrode.

5. The antenna module according to claim 1, wherein a first radiation direction in which the first radiation electrode radiates a radio wave is different from a second radiation direction in which the second radiation electrode radiates another radio wave.

6. The antenna module according to claim 5, wherein the first radiation direction is opposite to the second radiation direction.

7. The antenna module according to claim 5, wherein the first radiation direction and the second radiation direction are orthogonal to a direction normal to the main surface of the third substrate, and the first radiation direction is orthogonal to the second radiation direction on a plane of the main surface of the third substrate.

8. The antenna module according to claim 7, wherein one of the first radiation direction and the second radiation direction is a direction normal to the main surface of the third substrate, and the other of the first radiation direction and the second radiation direction is the direction orthogonal to the direction normal to the main surface of the third substrate.

9. The antenna module according to claim 1, wherein at least one of a main surface of the first substrate and a main surface of the second substrate faces a side surface of the third substrate.

10. The antenna module according to claim 9, wherein one of the main surface of the first substrate and the main surface of the second substrate faces the side surface of the third substrate, and the other of the main surface of the first substrate and the main surface of the second substrate faces the main surface of the third substrate.

11. The antenna module according to claim 9, wherein the side surface of the third substrate has a first surface and a second surface, a direction normal to the first surface being different from a direction normal to the second surface, and the main surface of the first substrate and the main surface of the second substrate face the first surface and the second surface, respectively.

12. The antenna module according to claim 1, wherein the main surface of the third substrate has a third surface and a fourth surface, a direction normal to the third surface being different from a direction normal to the fourth surface, and a main surface of the first substrate and a main surface of the second substrate face the third surface and the fourth surface, respectively.

13. The antenna module according to claim 1, wherein the first connection member is removable from the first substrate.

14. The antenna module according to claim 1, wherein the first connection member is integral with the first substrate.

15. The antenna module according to claim 1, further comprising an amplifier circuit configured to amplify a radio frequency signal conveyed between the first radiation electrode and the third substrate, the amplifier circuit being disposed in the first connection member.

16. The antenna module according to claim 1, further comprising a power supply circuit configured to supply a radio frequency signal to the first radiation electrode and the second radiation electrode.

17. The antenna module according to claim 16, wherein the power supply circuit is disposed on the second substrate.

18. The antenna module according to claim 17, further comprising a second connection member configured to convey a signal to the power supply circuit, the second connection member being connected between the second substrate and the third substrate.

19. A communication apparatus comprising:

an antenna module comprising a first substrate on which a first radiation electrode and a first ground electrode are disposed;

a second substrate on which a second radiation electrode and a second ground electrode are disposed;

a third substrate on which a third ground electrode is disposed; and a first connection member having a flat plate shape and connected between the first substrate and the second substrate, a fourth ground electrode being disposed on the first connection member, wherein the first connection member is configured to convey a radio frequency signal therethrough to the first radiation electrode, and a main surface of the first connection member is in contact with a main surface of the third substrate.

20. The communication apparatus according to claim 19, further comprising a display including a first display surface and a second display surface, wherein the display includes a bending portion that allows the display to be bent such that the first display surface faces the second display surface, the first substrate is disposed to face the first display surface, and the second substrate is disposed to face the second display surface.

* * * * *